United States Patent
Patel et al.

(10) Patent No.: US 8,949,410 B2
(45) Date of Patent: Feb. 3, 2015

(54) SERVER LOAD BALANCER SCALING FOR VIRTUAL SERVERS

(75) Inventors: Alpesh Patel, Cary, NC (US); Christopher O'Rourke, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 898 days.

(21) Appl. No.: 12/879,203

(22) Filed: Sep. 10, 2010

(65) Prior Publication Data

US 2012/0066371 A1 Mar. 15, 2012

(51) Int. Cl.
*G06F 15/173* (2006.01)
*H04L 29/08* (2006.01)

(52) U.S. Cl.
CPC ................................. *H04L 67/1031* (2013.01)
USPC .......................................... 709/224; 709/200

(58) Field of Classification Search
USPC .................................................. 709/200, 224
See application file for complete search history.

(56) References Cited

U.S. PATENT DOCUMENTS

| | | | |
|---|---|---|---|
| 5,774,660 A * | 6/1998 | Brendel et al. ................ | 709/201 |
| 6,725,253 B1 * | 4/2004 | Okano et al. .................. | 709/203 |
| 6,757,723 B1 | 6/2004 | O'Toole et al. | |
| 6,820,123 B1 | 11/2004 | Gourlay | |
| 6,920,506 B2 | 7/2005 | Barnard et al. | |
| 6,934,754 B2 | 8/2005 | West et al. | |
| 6,941,356 B2 | 9/2005 | Meyerson | |
| 6,944,653 B2 | 9/2005 | Fong et al. | |
| 6,970,913 B1 | 11/2005 | Albert et al. | |
| 7,020,090 B2 | 3/2006 | Chandwadkar et al. | |
| 7,089,328 B1 | 8/2006 | O'Rourke et al. | |
| 7,127,720 B2 * | 10/2006 | Cano et al. ..................... | 719/310 |
| 7,131,140 B1 | 10/2006 | O'Rourke et al. | |
| 7,155,722 B1 * | 12/2006 | Hilla et al. ..................... | 718/105 |
| 7,191,235 B1 | 3/2007 | O'Rourke et al. | |
| 7,284,053 B1 | 10/2007 | O'Rourke et al. | |
| 7,305,429 B2 * | 12/2007 | Borella ......................... | 709/203 |
| 7,340,526 B2 * | 3/2008 | Kime et al. ................... | 709/231 |
| 7,340,744 B2 | 3/2008 | Chandwadkar et al. | |
| 7,346,686 B2 | 3/2008 | Albert et al. | |
| 7,415,523 B2 | 8/2008 | O'Rourke et al. | |

(Continued)

OTHER PUBLICATIONS

Sun Microsystems, Inc., "Application Scalability & Fault Tolerance with Glashfish™ Load Balancer," White Paper, Apr. 2009, pp. 1-13.

(Continued)

*Primary Examiner* — Anthony Mejia
(74) *Attorney, Agent, or Firm* — Edell, Shapiro & Finnan, LLC

(57) ABSTRACT

Techniques are provided herein for receiving information at a device in a network indicating a load level for one or more server load balancers that are configured to manage network traffic load for a plurality of servers. The information represents an aggregate load across the plurality of servers. A determination is made as to whether the load level for one or more of the server load balancers exceeds a predetermined threshold. In response to determining that the load level for one or more of the server load balancers exceeds the predetermined threshold, an additional load balancer is activated that is configured to manage network traffic load for the plurality of servers. In response to determining that the load level for one or more of the server load balancers does not exceed the predetermined threshold, an additional load balancer is deactivated that was configured to manage network traffic load for the plurality of servers.

21 Claims, 12 Drawing Sheets

(56) References Cited

U.S. PATENT DOCUMENTS

| | | | |
|---|---|---|---|
| 7,454,489 B2* | 11/2008 | Chauffour et al. | 709/223 |
| 7,472,178 B2* | 12/2008 | Lisiecki et al. | 709/223 |
| 7,590,989 B2* | 9/2009 | Yim et al. | 719/328 |
| 7,624,169 B2* | 11/2009 | Lisiecki et al. | 709/223 |
| 7,630,877 B2* | 12/2009 | Brown et al. | 703/21 |
| 7,650,402 B1 | 1/2010 | Batz et al. | |
| 7,653,700 B1* | 1/2010 | Bahl et al. | 709/217 |
| 7,694,011 B2 | 4/2010 | O'Rourke et al. | |
| 7,719,974 B2 | 5/2010 | Chandwadkar et al. | |
| 7,738,452 B1 | 6/2010 | O'Rourke et al. | |
| 7,770,215 B2 | 8/2010 | O'Rourke et al. | |
| 7,941,556 B2* | 5/2011 | Canali et al. | 709/238 |
| 7,984,148 B2* | 7/2011 | Zisapel et al. | 709/226 |
| 7,984,151 B1* | 7/2011 | Raz et al. | 709/226 |
| 8,013,859 B2* | 9/2011 | Cannon, III | 345/440 |
| 8,095,662 B1* | 1/2012 | Lappas et al. | 709/226 |
| 8,150,951 B2 | 4/2012 | O'Rourke et al. | |
| 8,156,199 B1* | 4/2012 | Hoche-Mong et al. | 709/218 |
| 8,234,650 B1* | 7/2012 | Eppstein et al. | 718/104 |
| 8,296,434 B1* | 10/2012 | Miller et al. | 709/226 |
| 8,326,956 B2* | 12/2012 | Ma | 709/223 |
| 8,327,017 B1* | 12/2012 | Trost et al. | 709/238 |
| 8,510,434 B2* | 8/2013 | Wang et al. | 709/224 |
| 8,572,249 B2* | 10/2013 | Hopen et al. | 709/226 |
| 2003/0149755 A1* | 8/2003 | Sadot | 709/223 |
| 2003/0217064 A1* | 11/2003 | Walters | 707/100 |
| 2003/0229697 A1* | 12/2003 | Borella | 709/226 |
| 2004/0054780 A1 | 3/2004 | Romero | |
| 2004/0264481 A1* | 12/2004 | Darling et al. | 370/401 |
| 2004/0267920 A1* | 12/2004 | Hydrie et al. | 709/223 |
| 2005/0172011 A1* | 8/2005 | Gourlay et al. | 709/219 |
| 2006/0112170 A1* | 5/2006 | Sirkin | 709/217 |
| 2006/0168164 A1* | 7/2006 | Lemson et al. | 709/221 |
| 2006/0209688 A1* | 9/2006 | Tsuge et al. | 370/229 |
| 2006/0230407 A1* | 10/2006 | Rosu et al. | 718/105 |
| 2007/0011685 A1* | 1/2007 | Yim et al. | 718/105 |
| 2007/0143454 A1 | 6/2007 | Ma et al. | |
| 2007/0174660 A1* | 7/2007 | Peddada | 714/4 |
| 2007/0214282 A1* | 9/2007 | Sen | 709/245 |
| 2007/0260654 A1* | 11/2007 | Creamer et al. | 707/206 |
| 2008/0104608 A1* | 5/2008 | Hyser et al. | 718/105 |
| 2008/0225718 A1* | 9/2008 | Raja et al. | 370/235 |
| 2009/0070489 A1* | 3/2009 | Lu et al. | 709/245 |
| 2009/0089699 A1* | 4/2009 | Saha et al. | 715/771 |
| 2009/0094610 A1 | 4/2009 | Sukirya | |
| 2009/0172192 A1* | 7/2009 | Christian et al. | 709/242 |
| 2009/0328054 A1* | 12/2009 | Paramasivam et al. | 718/105 |
| 2010/0005175 A1 | 1/2010 | Swildens et al. | |
| 2010/0036903 A1* | 2/2010 | Ahmad et al. | 709/202 |
| 2010/0235441 A1* | 9/2010 | Christian et al. | 709/203 |
| 2010/0268764 A1 | 10/2010 | Wee et al. | |
| 2010/0274890 A1 | 10/2010 | Patel et al. | |
| 2010/0299763 A1 | 11/2010 | Marcus et al. | |
| 2011/0072073 A1* | 3/2011 | Curtis | 709/203 |
| 2011/0106949 A1 | 5/2011 | Patel et al. | |
| 2011/0126207 A1 | 5/2011 | Wipfel et al. | |
| 2011/0138384 A1 | 6/2011 | Bozek et al. | |
| 2011/0238733 A1* | 9/2011 | Yoo et al. | 709/203 |
| 2012/0017156 A1* | 1/2012 | Broda et al. | 715/736 |
| 2013/0173784 A1* | 7/2013 | Wang et al. | 709/224 |

OTHER PUBLICATIONS

"Big-IP Enterprise Controller," © 2001, F5 Networks, Inc., 4 pages.
Wollman et al., "Plug and Play Server Load Balancing and Global Server Load Balancing for Tactical Networks," © 2003, The MITRE Corporation, pp. 1-5.
Apache HTTP Server Version 22, Apache Module mod_proxy_balancer, Copyright 2011, The Apache Software Foundation, pp. 1-7.
Cisco Systems, Inc., "Cisco Content Services Switch Content Load-Balancing Configuration Guide," Chapter 3, Configuring Services, Software Version 7.50, Mar. 2005, 29 pages.

\* cited by examiner

Network distribution device 160 receives loading information from SLBs 130(1)-130(3) via links 185(1)-185(3), respectively.

Network management station (NMS) 180 receives loading information from SLBs 130(1)-130(3) via links 190(1)-190(3), respectively.

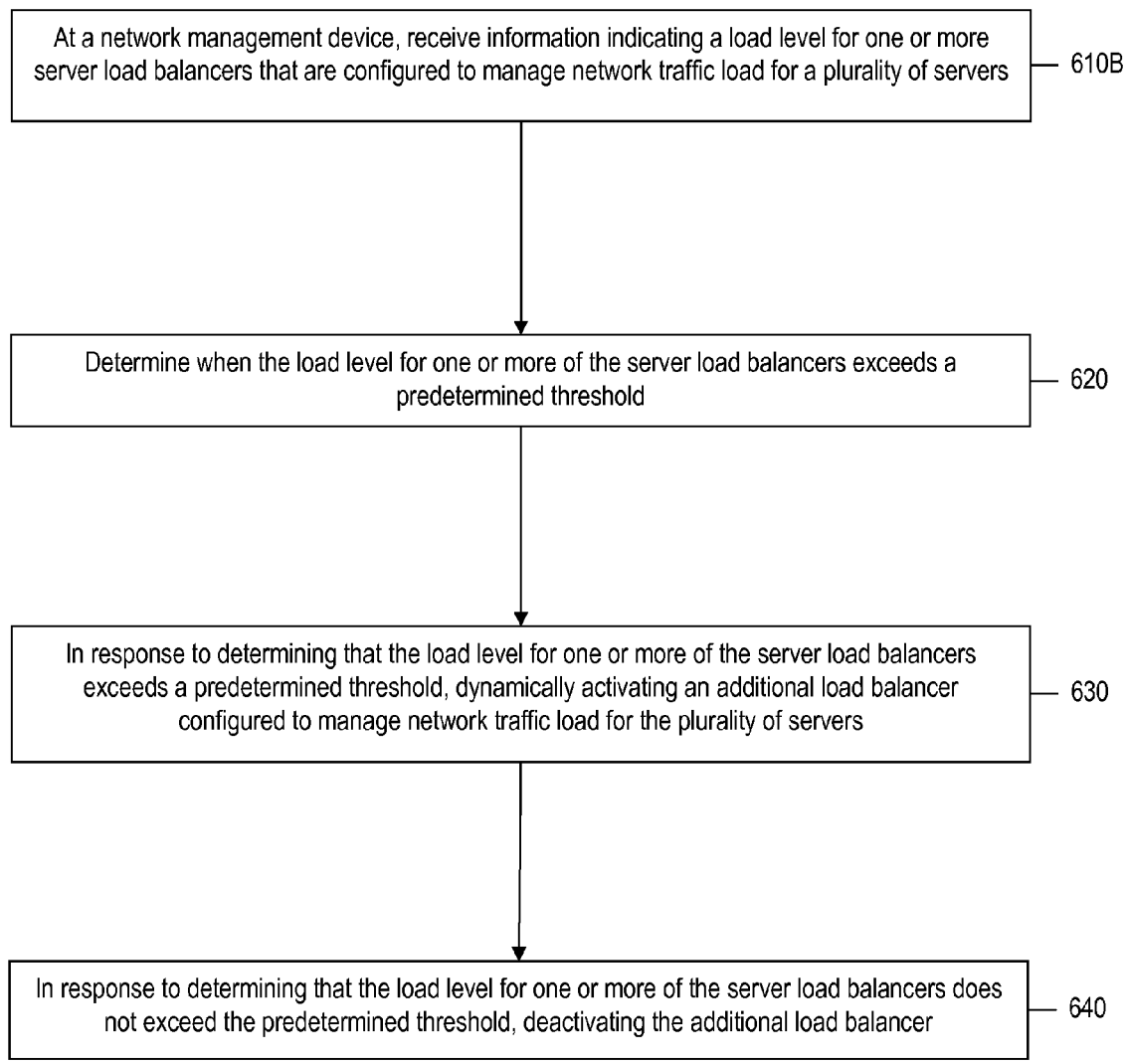

SERVER LOAD BALANCER SCALING FOR VIRTUAL SERVERS

TECHNICAL FIELD

The present disclosure generally relates to load balancing in a computer network and more specifically to dynamic allocation of server load balancers for one or more server farms.

BACKGROUND

Load balancing is a method used in computer networks to distribute workload evenly across two or more computers, network links, central processing units (CPUs), hard drives, etc. Load balancing attempts to avoid overloading a particular resource and may also provide better resource utilization, resource throughput, and minimize response times. The load balancing service may be provided by a software program or hardware device such as a multilayer switch or a Domain Name System (DNS) server. Load balancing is commonly used to mediate internal communications in computer clusters (high-availability clusters) or across servers in a server farm.

In a typical server farm environment, each server will report its loading to the load balancer. The load balancer will consider each server's load and other parameters when assigning new traffic to a server. For example, when the load on a server increases to a predetermined threshold, then a second server will be assigned a portion of the load while the original server is still processing requests. Thus, entities that have different network traffic profiles can reduce costs by sharing server access or migrating World Wide Web (WWW) services to server farms at different geographical locations to take advantage of local network traffic patterns or to reduce peak power consumption utility rates.

BRIEF DESCRIPTION OF THE DRAWINGS

FIG. 12 is an example of a flowchart generally depicting a process for a NMS to dynamically activate and deactivate server load balancers in a network.

DESCRIPTION OF EXAMPLE EMBODIMENTS

Overview

Techniques are provided herein for receiving at a device in a network information indicating a load level for one or more server load balancers that are configured to manage network traffic load for a plurality of servers. The information represents an aggregate load across the plurality of servers. A determination is made as to whether the load level for one or more of the server load balancers exceeds a predetermined threshold. In response to determining that the load level for one or more of the server load balancers exceeds the predetermined threshold, an additional load balancer that is configured to manage network traffic load for the plurality of servers is activated. In response to determining that the load level for one or more of the server load balancers does not exceed the predetermined threshold, an additional load balancer that was configured to manage network traffic load for the plurality of servers is deactivated.

Example Embodiments

Figure 1:
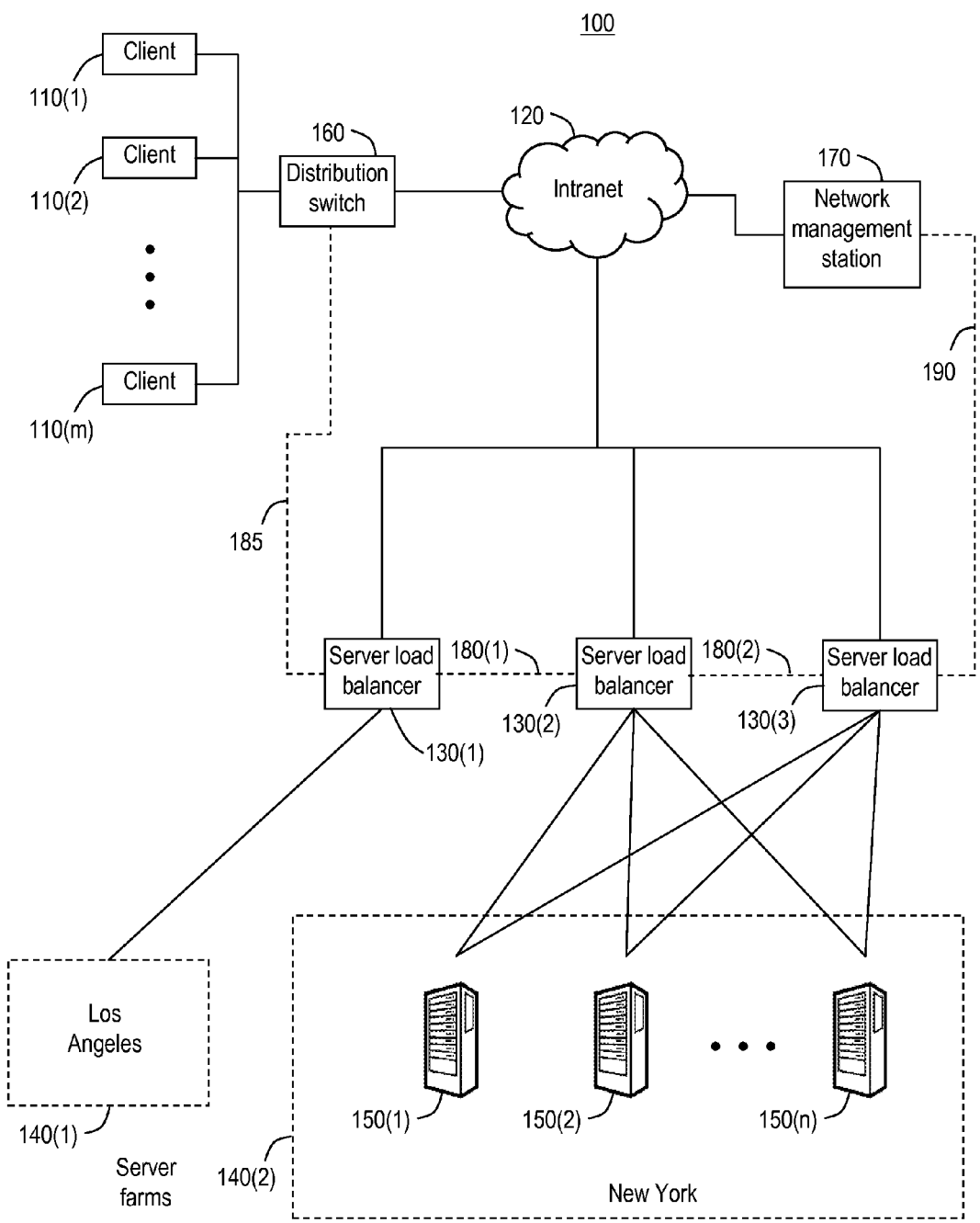
FIG. 1 is an example of a block diagram of a network with various network devices that are configured to perform load balancer scaling across one or more server farms.

Referring first to FIG. 1, an example system 100 is shown. System 100 comprises a plurality of client devices 110(1)-110(m), an Internet or Intranet 120, and a plurality of server load balancers 130(1)-130(3) that are serving server farms 140(1) and 140(2) in Los Angeles and New York, respectively, as an example. Within each server farm 140(1) and 140(2) is a plurality of servers, e.g., servers 150(1)-150(n) in server farm 140(2). There are servers in the server farm 140(1) as well but they are not shown in FIG. 1 for simplicity. System 100 also employs a network distribution device or distribution switch 160 that is configured to allocate network traffic throughout system 100. A network management station (NMS) 170 provides management and control functions associated with system 100.

System 100 is configured to provide application and data services to clients 110(1)-110(m). In this regard, system 100 may provide virtualized or cloud computing services with virtual machines running on servers in the server farms 140(1) and 140(2). In such a virtual environment, the load on any given server farm may grow or shrink dynamically. The server load balancers 130(1)-130(3) provide load balancing for servers in server farms 140(1) and 140(2). In this example, server load balancer 130(1) is providing server load balancing for server farm 140(1) and server load balancers 130(2) and 130(3) are providing server load balancing for servers 150(1)-150(n) in server farm 140(2).

According to the techniques described hereinafter, the server load balancers 130(1)-130(3) are configured to distribute information about their loading conditions and configurations. Each of the server load balancers 130(1)-130(3) monitors the load across the local server farms that they are servicing, as well as their individual network IO and CPU loads. The server load balancers 130(1)-130(3) are configured to distribute this information and other load or monitoring parameters throughout system 100.

In one example, the server load balancers 130(1)-130(3) collaborate by exchanging the load balancing information between each other using communication links 180(1) and 180(2). The information may be broadcast using a protocol similar to Web Cache Coordination Protocol (WCCP). Alternatively, the information may be shared across point-to-point links, e.g., as part of a mesh network. Other known information exchange methods may be employed. The information may also be relayed by a network element. As shown in FIG. 1, server load balancer 130(2) acts as a relay between server load balancer 130(1) and server load balancer 130(3). Once information is exchanged over communication links 180(1) and 180(2), the server load balancers 130(1)-130(3) can collaborate or decide among themselves if additional load balancers need to be activated or deactivated for any particular server farm or server within a server farm. Collaboration among load balancers allows for dynamic scaling and a greater range of scaling operations than static scaling implementations.

In an alternate scheme, the information may be sent to distribution switch 160 over communication link 185 and to NMS 170 over communication link 190. Distribution switch 160 may perform a server load balancing function by dynamically directing or redirecting network traffic to and from a server load balancer that is currently not performing a server load balancing function for any given set of servers, e.g., server load balancer 130(1) that is not currently load balancing for servers 150(1)-150(n). The newly directed traffic, when received by server load balancer 130(1) will cause the server load balancer 130(1) to distribute the traffic according its current configuration. The server load balancer 130(1) may also instantiate a virtual machine to handle the additional load balancing task, thereby achieving load balancing at the IP level instead of at the device or box level, i.e., a higher level of load balancer scaling granularity.

NMS 170 may perform tasks similar to those of distribution switch 160. For example, NMS 170 may direct distribution switch 160 to perform a load balancing task as described above, or NMS 170 may direct server load balancer 130(1) to perform load balancing for servers 150(1)-150(n). Thus, dynamic load balancing may be achieved using various network elements in an environment in which the load on any given server farm grows and shrinks dynamically. As new servers are added to a server farm to increase capacity, the server load balancers automatically adapt to the increased capacity.

Figure 2:
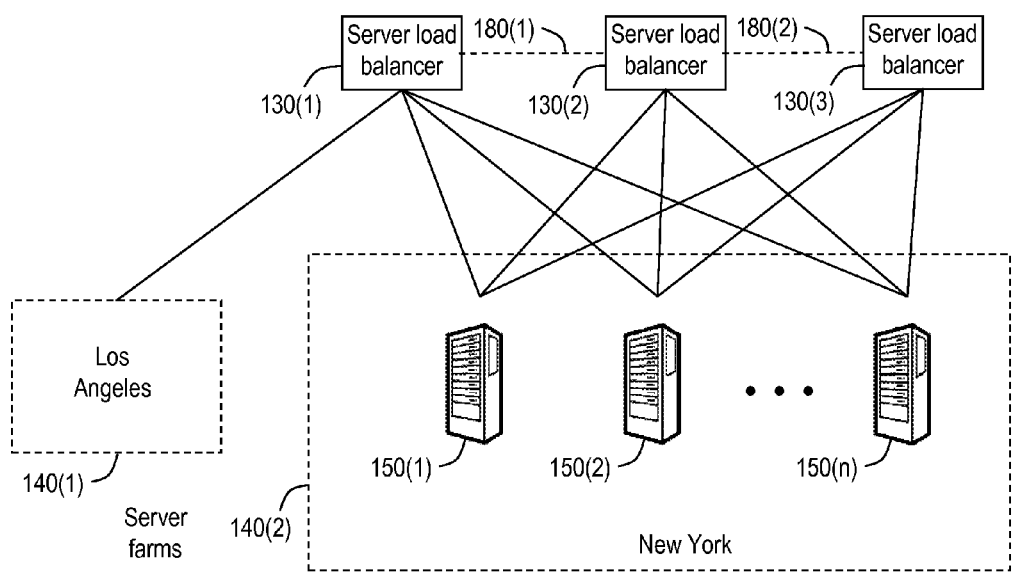
FIG. 2 is an example of a block diagram of a portion of the network from FIG. 1 in which a dedicated server load balancing device has been activated due to additional load at a server farm.

Referring to FIG. 2, a portion of the system 100 (FIG. 1) is shown in which a dedicated server load balancing device has been activated due to additional load at server farm 140(2). In this example, the load on server load balancers 130(2) and 130(3) has increased above a predetermined level or threshold. The load balancing information has been exchanged between the server load balancers 130(1)-130(3) over communication links 180(1) and 180(2). Server load balancer 130(1) has been activated in response to the increased load on server load balancers 130(2) and 130(3). Server load balancer 130(1) was not previously configured to manage network traffic load for the plurality of servers in server farm 140(2) and now services servers 150(1)-150(n) in server farm 140(2) as shown. Server load balancer 130(1) may receive new traffic using methods described above or server load balancer 130(1) may perform a route injection in order to advertise to system 100 that it has the ability to take on or accept additional traffic for server farm 140(2).

Figure 3:
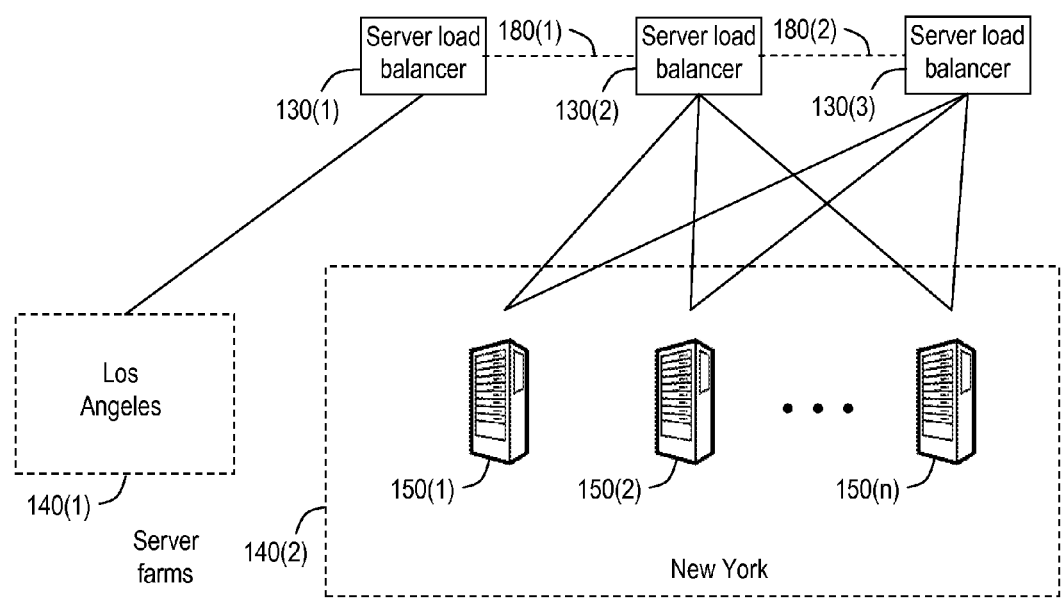
FIG. 3 is an example of a first dedicated server load balancing device that has been deactivated due to reduced load at a server farm.

Referring now to FIG. 3, a portion of the system 100 from FIG. 2 is shown in which a server load balancing device has been deactivated due to reduced load at server farm 140(2). In this example, server load balancer 130(1) has been deactivated from servicing server farm 140(2) by way of agreement with server load balancers 130(2) and 130(3). Server load balancer 130(1) may withdraw any routes that were injected, destruct any corresponding virtual machines and free their memory, or otherwise signal network elements in system 100 that it is no longer servicing server farm 140(2).

Figure 4:
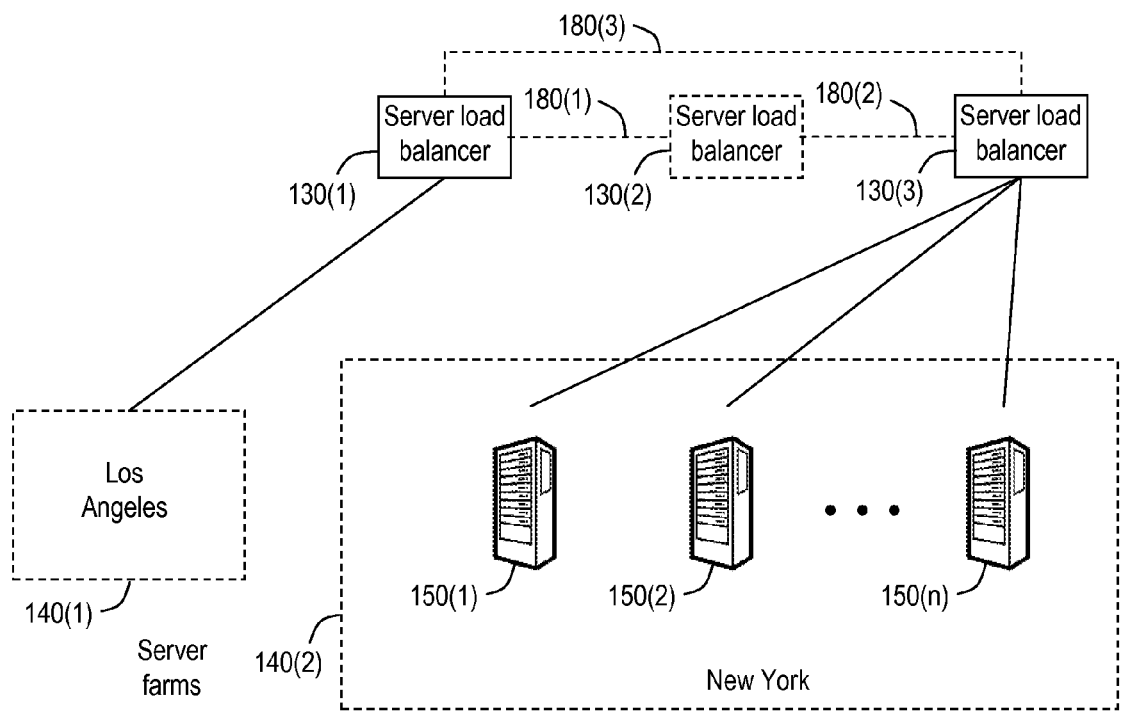
FIG. 4 is an example of a second dedicated server load balancing device that has been deactivated due to reduced load at a server farm.

Referring to FIG. 4, a portion of the system 100 from FIG. 3 is shown in which an additional server load balancing device has been deactivated due to reduced load at server farm 140(2). In this example, server load balancer 130(2) has been deactivated from servicing server farm 140(2). Server load balancer 130(2) may be taken out of service in a manner similar to server load balancer 130(1). Server load balancer 130(2) is no longer performing a server load balancing function and is placed in a sleep or power saving mode as shown by the dashed line. Signaling may be maintained between server load balancer 130(1) and server load balancer 130(3) by a new communication link 180(3), by an active network interface card (NIC) in server load balancer 130(2) using communication links 180(1) and 180(2), or by other signaling methods. Should the load to server farm 140(2) increase, additional load may be absorbed by server load balancer 130(1) or server load balancer 130(2) may be given a wakeup signal and reactivated, e.g., if server load balancer 130(2) has a higher priority than server load balancer 130(1) with respect to server farm 140(2) then it may be reactivated before server load balancer 130(1).

Figure 5:
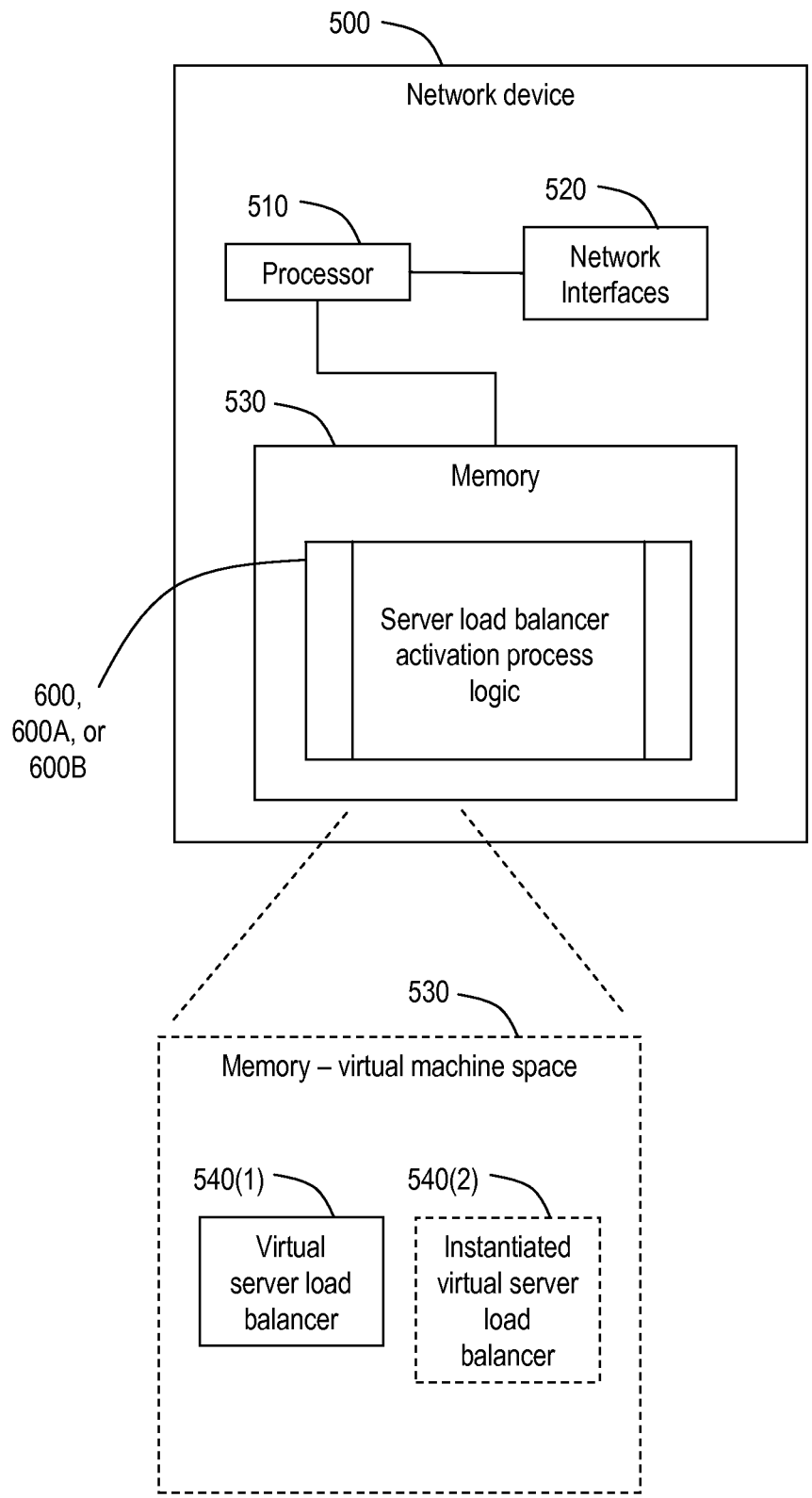
FIG. 5 is an example of a block diagram of a network device that is configured to dynamically activate and deactivate server load balancers in a network.

Referring to FIG. 5, an example block diagram is shown of a network device 500 that is configured to dynamically activate and deactivate server load balancers in a network. Network device 500 comprises a data processing device 510, a plurality of network interfaces 520, and a memory 530. Resident in the memory 530 is software for server load balancer activation process logic 600, 600A, or 600B that may be employed on different network devices. Process logic 600 may be employed by a server load balancer, e.g., server load balancers 130(1)-130(3) from FIG. 1. Process logic 600 has been generally described hereinbefore in connection with FIGS. 1-4 and will be described in greater detail in connection with FIG. 6. Additional features will also be described in connection with process logic 600A and 600B.

Process logic 600A may be employed by a network distribution device, e.g., distribution switch 160 from FIG. 1. Process logic 600A will be described in connection with FIGS. 7-9. Process logic 600B may be employed by a network management device, e.g., NMS 170 from FIG. 1. Process logic 600B will be described in connection with FIGS. 10-12. Process logic 600, 600A, and 600B may be implemented in hardware using hardware logic, firmware using embedded control, or be implemented in a combination of hardware, firmware, and software.

The data processing device 510 is, for example, a microprocessor, a microcontroller, systems on a chip (SOCs), or other fixed or programmable logic. The data processing device 510 is also referred to herein simply as a processor. The memory 530 may be any form of random access memory (RAM) or other tangible (non-transitory) memory media that stores data used for the techniques described herein. The memory 530 may be separate or part of the processor 510. Instructions for performing the process logic 600, 600A, or 600B may be stored in the memory 530 for execution by the processor 510 such that when executed by the processor, causes the processor to perform the operations describe herein in connection with FIGS. 6, 9, and 12. The network interfaces 520 enable communication throughout system 100 shown in FIG. 1. It should be understood that any of the devices in system 100 may be configured with a similar hardware or software configuration as network device 500.

The functions of the processor 510 may be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 530 stores data used for the computations or functions described herein (and/or to store software or processor instructions that are executed to carry out the computations or functions described herein). Thus, functions of the process logic 600, 600A, or 600B may be implemented with fixed logic or programmable logic (e.g., software or computer instructions executed by a processor or field programmable gate array (FPGA)).

The memory 530 may also be configured to host virtual machines 540(1) and 540(2) in a virtual machine memory space that are each configured to act as virtual server load balancers. The memory 530 and other resources of network device 500 may be allocated or partitioned for each virtual machine. Network device 500 may monitor and report the load for each virtual machine or each virtual machine may exchange the information. When the load on one virtual machine gets too high, e.g., on virtual server load balancer 540(1), then the virtual load balancer may be instantiated, e.g., instantiated virtual server load balancer 540(2). The network device 500 may perform the instantiation process on its own or receive a command from another network device such as an NMS. In other examples, the instantiated virtual server load balancer 540(2) may be instantiated on other devices to achieve additional load balancing. Once two or more load balancers are operational, then collaboration may begin between one or more server load balancers operating on network device 500 or between the one or more server load balancers on network device 500 and other server load balancers, e.g., not operating on network device 500, by exchanging information representing the load levels among the various server load balancers.

Figure 6:
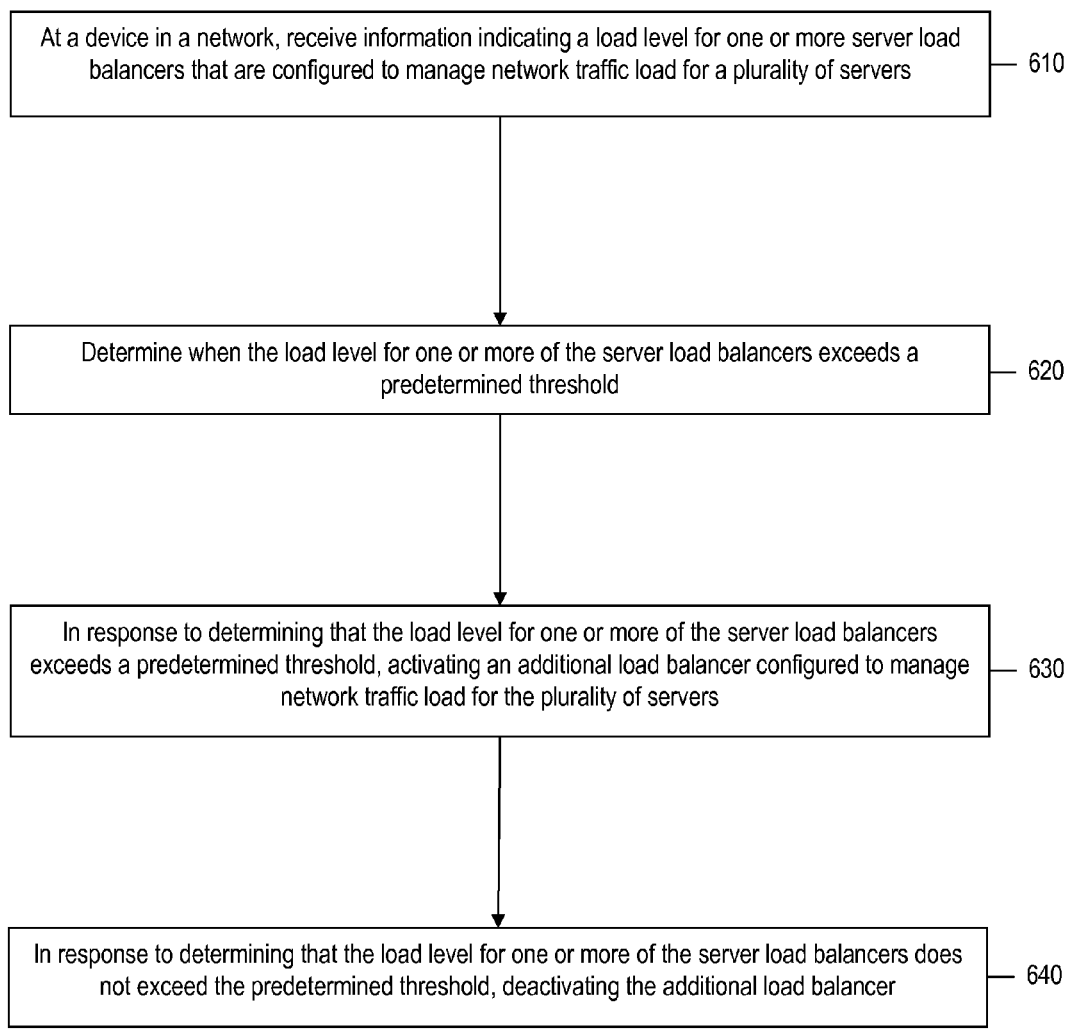
FIG. 6 is an example of a flowchart generally depicting a process for activating and deactivating server load balancers in a network.

Turning to FIG. 6, an example of a flowchart is shown that generally depicts the operations of the process logic 600. At 610, information is received at a device in a network that indicates a load level for one or more server load balancers that are configured to manage network traffic load for a plurality of servers. The information represents an aggregate load across the plurality of servers, e.g., a number of servers at a local server farm serviced by a load balancer. The information may be network input-output (IO) load, central processing unit (CPU) load, memory utilization, or other load monitoring parameters for the server load balancer.

The server load balancer generating the aggregate load information may be a dedicated hardware device or a virtual machine. When the server load balancer is a dedicated device, the aggregate load may be measured for services at the device level. For example, the network IO load, CPU load, and memory use would be generated for the device. When the server load balancer is a virtual machine, the aggregate load may be measured for services at the virtual machine level. The virtual machine may be one of many virtual machines running on a device. Each virtual machine is allocated a portion of the devices network IO, CPU load, and memory, e.g., network IO, CPU, and memory partitions similar to those allocated for processes associated with Real-Time Operating Systems (RTOS), embedded or not. The network IO load, CPU load, and memory use would be generated relative to the virtual machine's allocation. For example, if the virtual machine is allocated 10% of the host devices CPU time, then when the virtual machine is using 10% of the host device CPU time its virtual CPU resource utilization rate is 100%, 9% of the host device CPU time equates to a virtual CPU resource utilization rate of 90%, and so on.

The plurality of servers may be grouped into sets that reside at various geographic locations. For example, two or more geographic sites may each comprise a subset of the plurality servers that are not configured to serve a particular virtual service and the additional server is activated at one geographic site to handle additional traffic for the particular virtual service.

At 620, a determination is made as to whether the load level for one or more of the server load balancers exceeds a predetermined threshold. At 630, in response to determining that the load level for one or more of the server load balancers exceeds the predetermined threshold, an additional load balancer is activated that is configured to manage network traffic load for the plurality of servers. Once a new server load balancer has been activated, then it will start to collaborate with other network devices and report its aggregate load information.

The server load balancers may also be associated with the various geographic locations and given an activation priority with respect to each geographic site or location. For example, a given server load balancer may be given a high priority with respect to a server farm in Los Angeles and a lower priority with respect to a server farm in New York. When the load at server farm in New York increases to the point that an additional server load balancer is needed, the server load balancer with the higher priority with respect to Los Angeles will not be activated until server load balancers with higher priority with respect to New York have been exhausted.

At 640, in response to determining that the load level for one or more of the server load balancers does not exceed the predetermined threshold, an additional load balancer is deactivated that was configured to manage network traffic load for the plurality of servers. In addition to activating or deactivating server load balancers, the process logic 600 may also activate servers, wake up sleeping servers, or deactivate servers in any given server farm. By way of example, if a news-based web service is hosted on servers in a server farm and a disaster strikes, then the news-based web service will experience increased web traffic from individuals interested in the disaster or that want to retrieve disaster information. In response to the increased demand, additional server load balancers will be needed and as individual servers hosting the web service become loaded, the news-based web service application will have to be added to additional servers.

Figure 7:
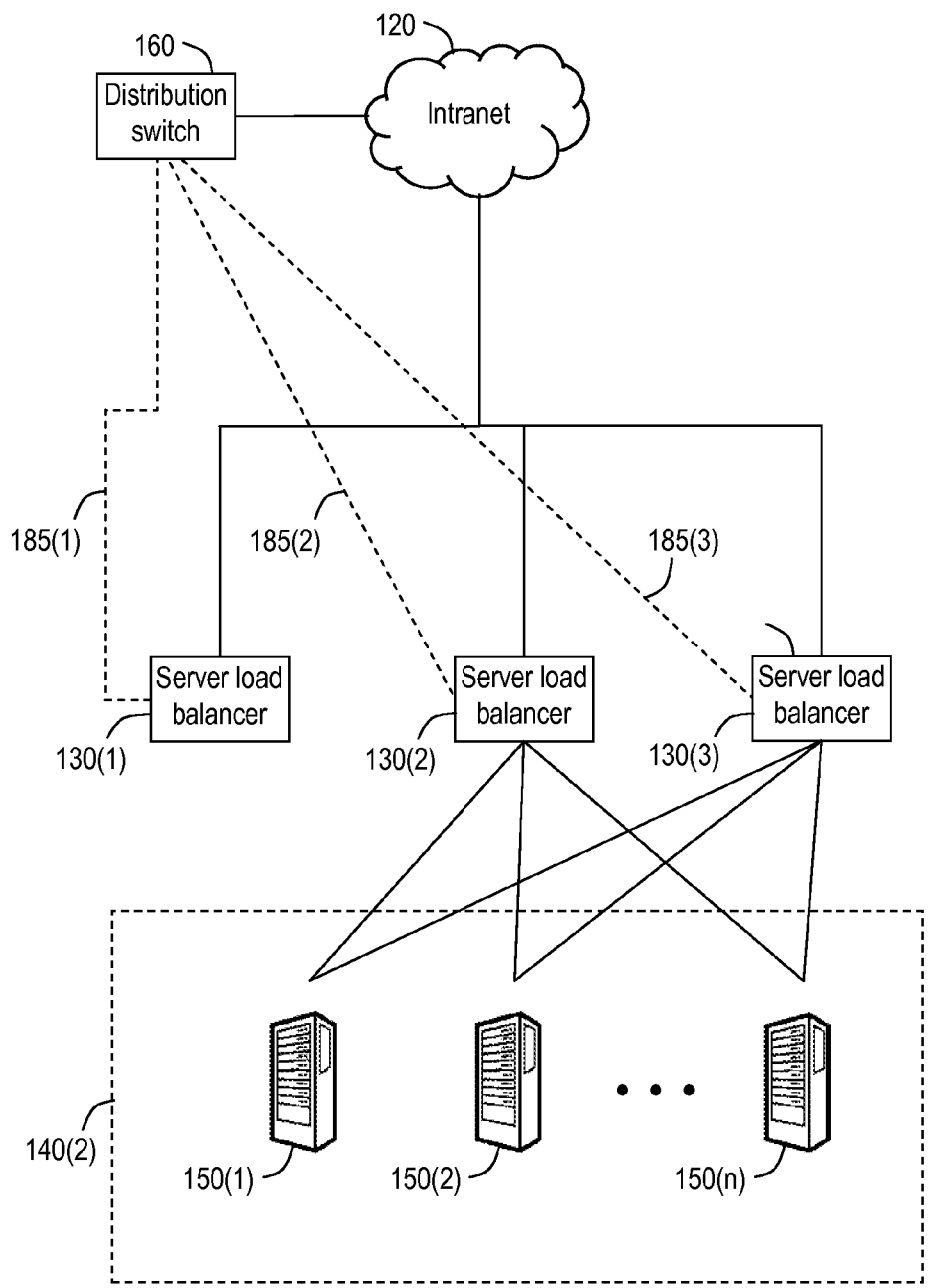
FIG. 7 is an example of a block diagram of a portion of the network from FIG. 1 in which server load balancing devices send loading information to an upstream device configured to activate an additional load balancer or redirect traffic to the additional load balancer.

Referring to FIG. 7, a portion of the system 100 (FIG. 1) is shown in which server load balancing devices send loading information to an upstream device, e.g., distribution switch 160, that is configured to activate an additional load balancer or redirect traffic by way of its internal load balancer to an additional load balancer. In this example, distribution switch 160 receives load balancing information from server load balancers 130(1)-130(3) via communication links 185(1)-185(3). Server load balancers 130(2) and 130(3) are currently servicing servers 150(1)-150(n) in server farm 140(2), while server load balancer 130(1) is inactive.

Figure 8:
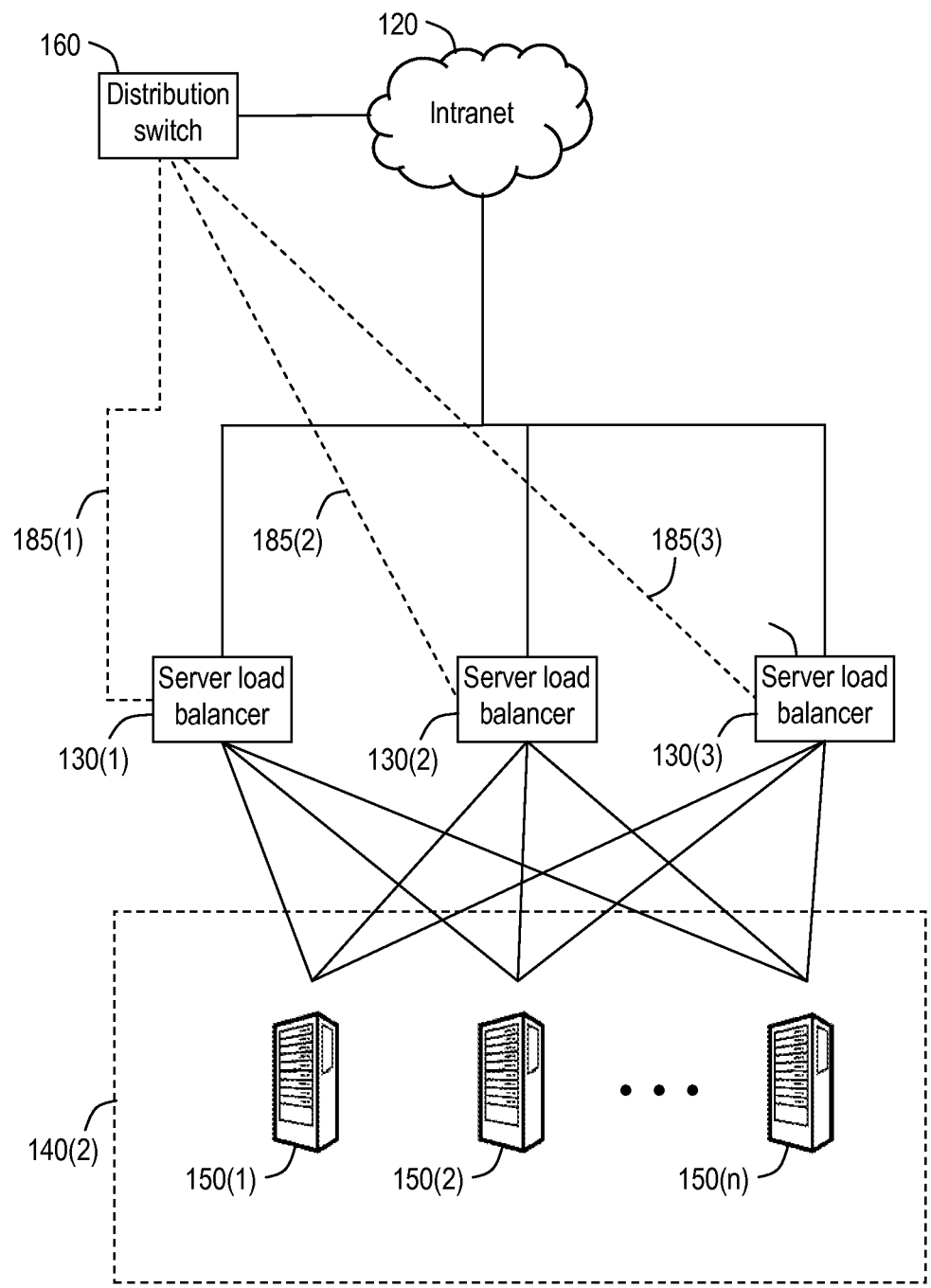
FIG. 8 is an example of a block diagram of the network from FIG. 7 in which the additional load balancer is handling part of the load for a server farm.

Referring to FIG. 8, a portion of the system 100 from FIG. 7 is shown in which a dedicated server load balancing device has been activated due to additional load at server farm 140(2). When the load on server load balancer 130(2) or 130(3) exceeds a predetermined threshold the distribution switch 160 will activate server load balancer 130(1) in order to provide server load balancing for servers 150(1)-150(n) in server farm 140(2) as shown. Server load balancer 130(1) may be a hardware device or a virtual machine. Server load balancer 130(1) is assigned a virtual IP (VIP) address and distribution switch 160 will forward some traffic to its VIP. Server load balancer 130(1) will load balance the new traffic accordingly.

Distribution switch 160 may also perform any number of dynamic load balancing functions. In one example, distribution switch 160 acts as or coordinates with a DNS server to provide the appropriate VIPs to the clients. The clients are then naturally directed to a VIP for a desired load balancer. Distribution switch 160 may also perform dynamic IP address rewrites or modifications to balance traffic across the various routes to server load balancers 130(1)-130(3), e.g., using a Cisco Express Forwarding (CEF) type mechanism. The routes may be prioritized, or given a weight or cost to adjust the flow over each route. Thus, distribution switch 160 may perform transport level load balancing. The distribution switch 160 may also instantiate virtual machines within itself, as necessary, in order to perform any newly added load balancing functions.

In another example, once activated by distribution switch 160, server load balancer 130(1) performs route injection or route modification to advertise route to a set of VIPs distributed by distribution switch 160 or a DNS server. The server load balancers may advertise based on their priority or advertise a route cost that is consistent with their priority. The server load balancers may also simply advertise that a VIP is available for load growth or unavailable as load shrinks. The server load balancers may employ existing Dynamic Feedback Protocol (DFP) or Keepalive-Application Protocol (KAL-AP) techniques. The server load balancers may also advertise a utilization rate to the DNS servers, e.g., advertising 100% utilization would indicate that a particular load balancer can not take on additional load.

Figure 9:
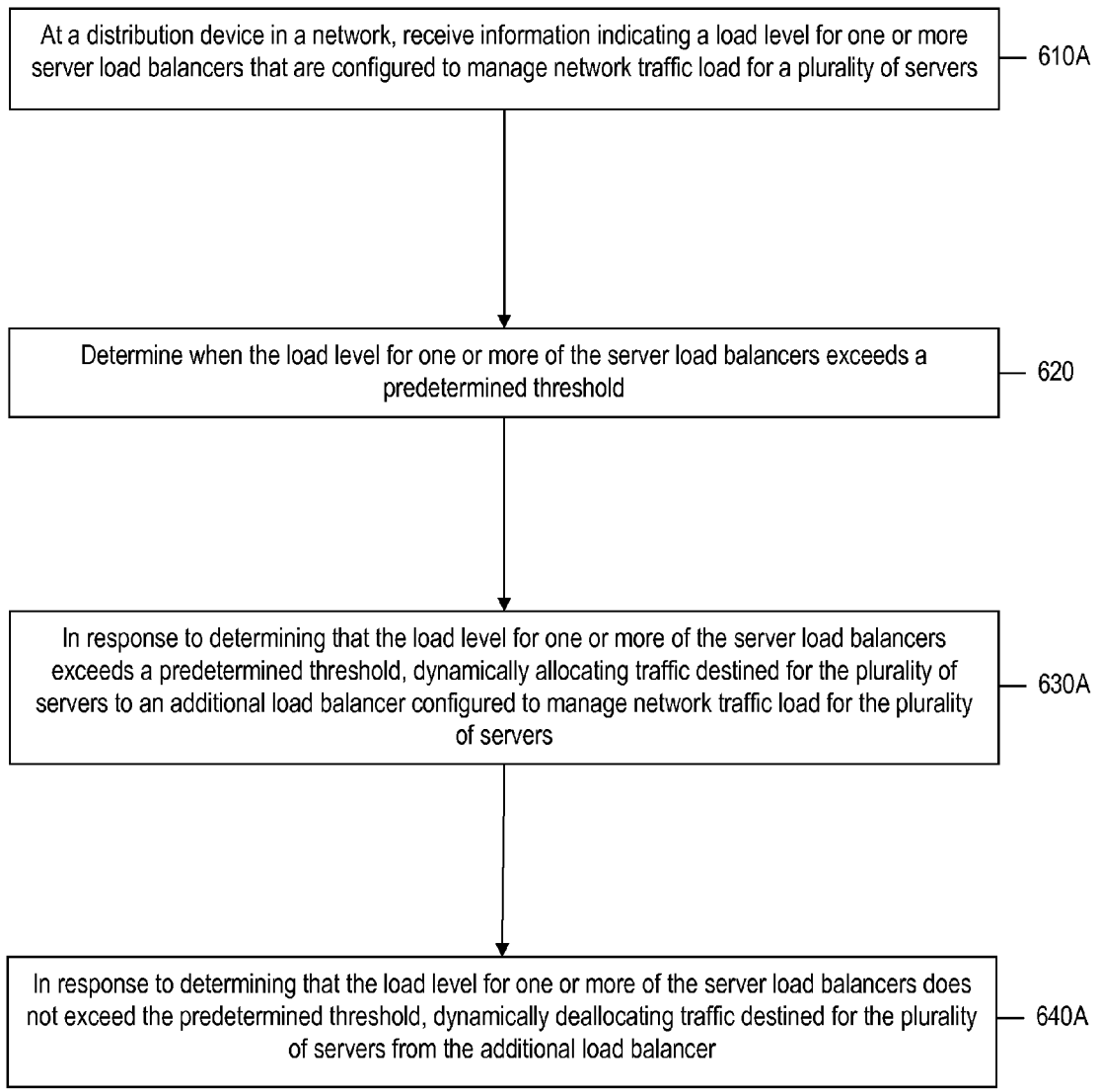
FIG. 9 is an example of a flowchart generally depicting a process for dynamically allocating and deallocating traffic to server load balancers in a network.

Turning now to FIG. 9, an example of a flowchart is shown that generally depicts the operations of the server load balancer process logic 600A that may be employed by distribution switch 160 will be described. At 610A, information is received at a distribution device in a network that indicates a load level for one or more server load balancers that are configured to manage network traffic load for a plurality of servers. The information may represent an aggregate load at a server load balancer as described above.

At 620, as in process logic 600, a determination is made as to whether the load level for one or more of the server load balancers exceeds a predetermined threshold. In another example with respect to load, the information may represent an individual aggregate load for each of a plurality of load balancers. Metrics may be generated from the individual loads by accumulating or summing the individual loads to obtain a total load, the individual loads may be averaged or weighted according to priority, or they may be evaluated individually to determine if any of the loads or metrics exceed any number of predetermined thresholds. Other deterministic or statistical processes may be employed such as averages, moving averages, Gaussian or Poisson distribution based statistics, time of day or seasonal usage statistics, etc., when determining if certain thresholds have been met.

At 630A, in response to determining that the load level for one or more of the server load balancers exceeds the predetermined threshold, traffic destined for the plurality of servers is dynamically allocated to an additional load balancer that is configured to manage network traffic load for the plurality of servers. At 640A, in response to determining that the load level for one or more of the server load balancers does not exceed the predetermined threshold, traffic destined for the plurality of servers is dynamically de-allocated from the additional load balancer.

Figure 10:
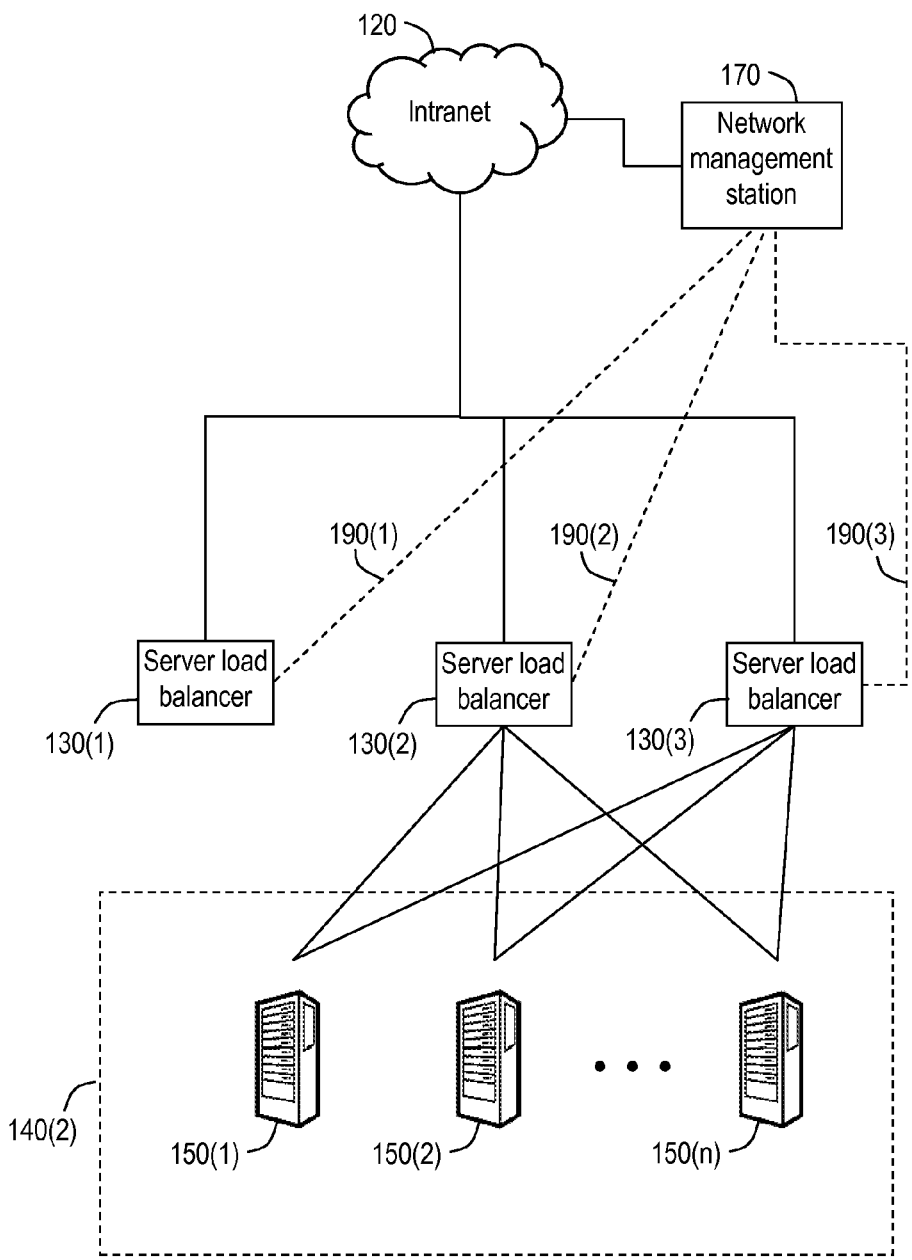
FIG. 10 is an example of a block diagram of a portion of the network from FIG. 1 in which server load balancing devices send loading information to a network management station (NMS) configured to activate an additional load balancer or redirect traffic to the additional load balancer.

Referring to FIG. 10, a portion of the system 100 (FIG. 1) is shown in which server load balancing devices send loading information to NMS 170 that is configured to activate an additional load balancer or redirect traffic to an additional load balancer. In this example, NMS 170 receives load balancing information from server load balancers 130(1)-130(3) via communication links 190(1)-190(3). Server load balancers 130(2) and 130(3) are currently servicing servers 150(1)-150(n) in server farm 140(2), while server load balancer 130(1) is inactive.

Figure 11:
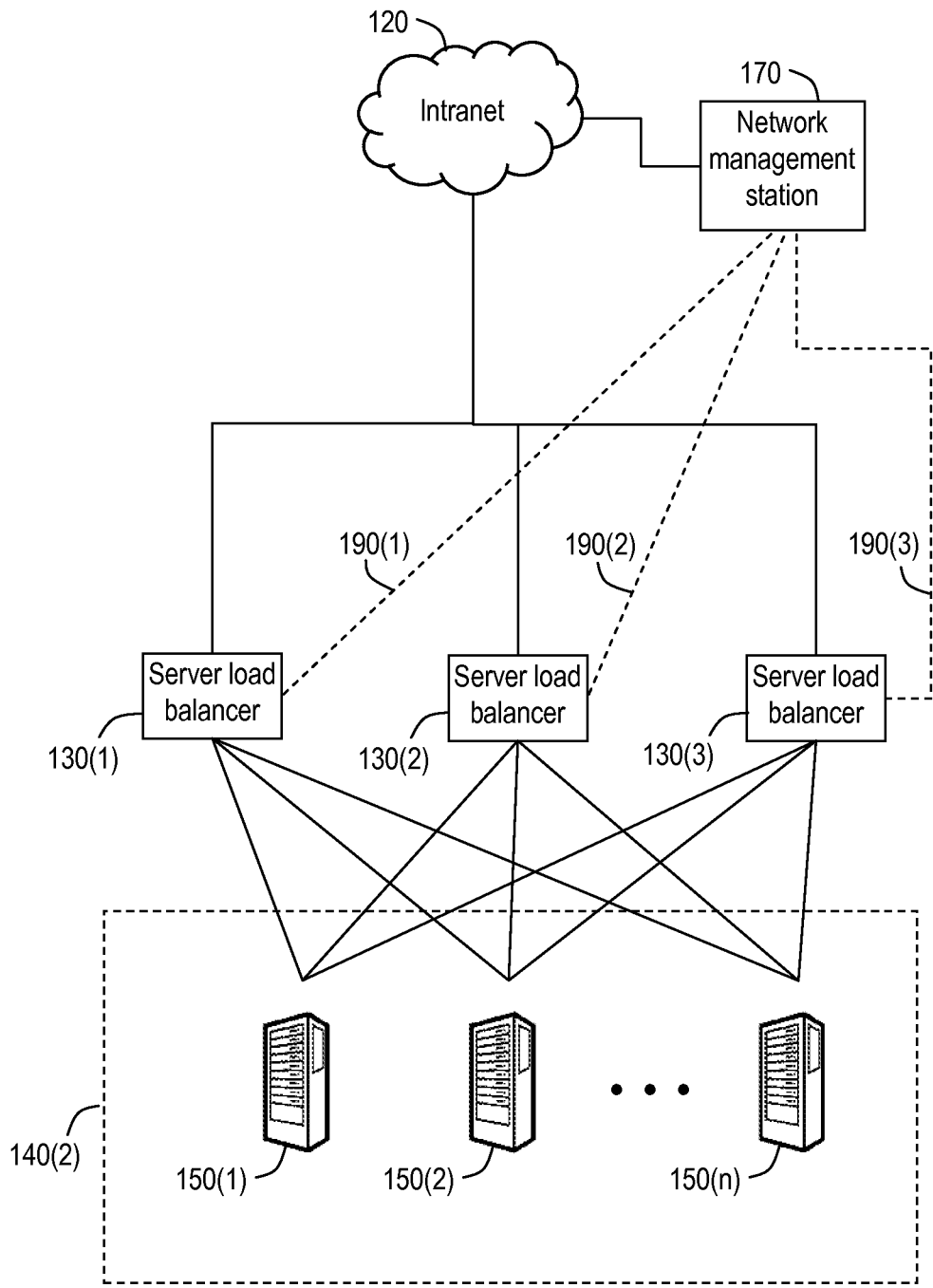
FIG. 11 is an example of a block diagram of the network from FIG. 10 in which the additional load balancer is handling part of the load for a server farm.

Referring to FIG. 11, a portion of the system 100 from FIG. 10 is shown in which a dedicated server load balancing device has been activated due to additional load at server farm 140(2). When the load on server load balancer 130(2) or 130(3) exceeds a predetermined threshold the NMS 170 will activate server load balancer 130(1) in order to provide server load balancing for servers 150(1)-150(n) in server farm 140(2) as shown. Server load balancer 130(1) may be a hardware device or a virtual machine. Server load balancer 130(1) is assigned a VIP address and traffic will be routed to server load balancer 130(1) as described above.

In the network configuration shown in FIG. 10, NMS 170 may also direct the activities of a network distribution device, e.g., distribution switch 160 (FIG. 8) to perform the various functions described above. NMS 170 may also configure the server load balancers 130(1)-130(3) to perform application level load balancing that is performed at the application layer (Layer 7). Server load balancers 130(1)-130(3) may perform Hypertext Transfer Protocol (HTTP) cookie injection, or hash user or session IDs, e.g., to maintain session persistence or user/client affinity with a physical server for stateful sessions with session specific data stores. NMS 170 may also configure server load balancers 130(1)-130(3) to allow direct server return to a client or to initiate HTTP server redirects.

Turning now to FIG. 12, an example of a flowchart is shown that generally depicts the operations of the server load balancer process logic 600B that may be employed by NMS 170 will be described. At 610B, information is received at a network management device in a network that indicates a load level for one or more server load balancers that are configured to manage network traffic load for a plurality of servers. At 620, as in process logic 600, a determination is made as to whether the load level for one or more of the server load balancers exceeds a predetermined threshold. At 630, as in process logic 600, in response to determining that the load level for one or more of the server load balancers exceeds the predetermined threshold, an additional load balancer is activated that is configured to manage network traffic load for the plurality of servers. At 640, as in process logic 600, in response to determining that the load level for one or more of the server load balancers does not exceed the predetermined threshold, the additional load balancer is deactivated.

Techniques are provided herein for receiving at a device in a network information indicating a load level for one or more server load balancers that are configured to manage network traffic load for a plurality of servers. The information represents an aggregate load across the plurality of servers. A determination is made as to whether the load level for one or more of the server load balancers exceeds a predetermined threshold. In response to determining that the load level for one or more of the server load balancers exceeds the predetermined threshold, an additional load balancer is activated that is configured to manage network traffic load for the plurality of servers. In so doing, load is "attracted" to the active load balancers through network communications between the load balancers. Route injection and feedback to DNS entities are examples described herein of mechanisms to "attract load". In response to determining that the load level for one or more of the server load balancers does not exceed the predetermined threshold, an additional load balancer is deactivated that was configured to manage network traffic load for the plurality of servers.

In summary, the techniques described herein provide a way for network elements to communicate server farm and server load balancing characteristics among themselves to dynamically decide whether to dynamically add, delete, or maintain a number of server load balancers, and to dynamically add, delete, or maintain a number of servers in one or more server farms associated with the load balancers, in order to provide a cost effective and resource efficient alternatives in the server load balancing market. Moreover, these techniques allow for automation of service scaling, concentration of load in the most economical datacenters and allow for dramatic scaling (up and down) of a service when events occur (e.g., web service after a major news event). Without cross load balancer coordination, scaling is limited to the scalability of a static set of sites.

The above description is intended by way of example only.

What is claimed is:

1. A method comprising:
at a device in a network that comprises one or more server load balancers configured to assign received network traffic to one of a plurality of servers based on the load of each of the plurality of servers, receiving information from the one or more server load balancers indicating a load level for one or more server load balancers and an aggregate load across the plurality of servers;
determining when the load level for at least one of the one or more of the server load balancers exceeds a predetermined threshold;
in response to determining that the load level for at least one of the one or more of the server load balancers exceeds the predetermined threshold, activating an additional server load balancer configured to assign received network traffic to one of the plurality of servers based on the load of each of the plurality of servers; and
dynamically allocating the received network traffic to the one or more server load balancers and the additional server load balancer, by performing dynamic modification of one or more Internet Protocol (IP) addresses of one or more respective server load balancers of the one or more server load balancers and the additional server load balancer,
wherein the device is an upstream device relative to the one or more server load balancers and a direction of network traffic.

2. The method of claim 1, further comprising:
in response to determining that the load level for at least one of the one or more of the server load balancers does not exceed a predetermined threshold, deactivating an additional server load balancer that was configured to manage network traffic load for the plurality of servers.

3. The method of claim 1, wherein activating comprises activating the additional server load balancer on a server load balancer device that was not previously configured to manage network traffic load for the plurality of servers.

4. The method of claim 1, wherein the device in the network is at least one of a network management device, or an upstream network distribution device.

5. The method of claim 1, wherein activating comprises activating the additional server load balancer by configuring the additional load balancer to perform route injection configured to advertise the additional server load balancer's ability to take on load.

6. The method of claim 1, wherein activating comprises activating the additional server load balancer according to a priority assigned to two or more geographic sites each comprising a subset of the plurality of servers.

7. The method of claim 6, wherein one of the two or more geographic sites comprises a subset of the plurality servers that are not configured to serve a particular virtual service and further comprising activating an additional server at the one geographic site to handle additional traffic for the particular virtual service.

8. The method of claim 1, wherein activating comprises activating a virtual server load balancer.

9. The method of claim 8, wherein activating comprises instantiating a virtual machine comprising the virtual server load balancer.

10. The method of claim 9, wherein instantiating comprises instantiating the virtual server load balancer on an active server load balancer device configured to manage network traffic load for the plurality of servers.

11. An apparatus comprising:
one or more network interfaces configured to communicate over a network;
a processor coupled to the one or more network interfaces and configured to:
receive information over the network from one or more server load balancers configured to assign received network traffic to one of a plurality of servers based on the load of each of the plurality of servers, wherein the information indicates a load level for the one or more server load balancers and an aggregate load across the plurality of servers;
determine when the load level for at least one of the one or more of the server load balancers exceeds a predetermined threshold;
in response to determining that the load level for at least one of the one or more of the server load balancers exceeds the predetermined threshold, activate an additional server load balancer configured to assign received network traffic to one of the plurality of servers based on the load of each of the plurality of servers; and
dynamically allocate the received network traffic to the one or more server load balancers and the additional server load balancer, by performing dynamic modification of one or more Internet Protocol (IP) addresses of one or more respective server load balancers of the one or more server load balancers and the additional server load balancer,
wherein the apparatus is an upstream device relative to the one or more server load balancers and a direction of network traffic.

12. The apparatus of claim 11, wherein the processor is further configured to:
deactivate an additional server load balancer that was configured to manage network traffic load for the plurality of servers in response to determining that the load level for at least one of the one or more of the server load balancers does not exceed a predetermined threshold.

13. The apparatus of claim 11, wherein the processor is further configured to activate the additional server load balancer according to a priority assigned to two or more geographic sites each comprising a subset of the plurality of servers.

14. The apparatus of claim 11, wherein the processor is further configured to activate the additional server load balancer by instantiating a virtual machine comprising the virtual server load balancer.

15. A non-transitory computer readable medium storing instructions that, when executed by a processor, cause the processor to:
- receive information from one or more server load balancers configured to assign received network traffic to one of a plurality of servers based on the load of each of the plurality of servers, wherein the information indicates a load level for the one or more server load balancers and an aggregate load across the plurality of servers;
- determine when the load level for at least one of the one or more of the server load balancers exceeds a predetermined threshold;
- in response to determining that the load level for at least one of the one or more of the server load balancers exceeds the predetermined threshold, activate an additional server load balancer configured to assign received network traffic to one of the plurality of servers based on the load of each of the plurality of servers; and
- dynamically allocate the received network traffic to the one or more server load balancers and the additional server load balancer, by performing dynamic modification of one or more Internet Protocol (IP) addresses of one or more respective server load balancers of the one or more server load balancers and the additional server load balancer,
- wherein the computer readable medium and processor are incorporated in a device that is upstream relative to the one or more server load balancers and a direction of network traffic.

16. The non-transitory computer readable medium of claim 15, further comprising instructions that, when executed by the processor, cause the processor to deactivate an additional server load balancer that was configured to manage network traffic load for the plurality of servers in response to determining that the load level for at least one of the one or more of the server load balancers does not exceed a predetermined threshold.

17. The non-transitory computer readable medium of claim 15, further comprising instructions that, when executed by the processor, cause the processor to activate the additional server load balancer according to a priority assigned to two or more geographic sites each comprising a subset of the plurality of servers.

18. The non-transitory computer readable medium of claim 15, further comprising instructions that, when executed by the processor, cause the processor to activate the additional server load balancer by instantiating a virtual machine for a virtual server load balancer.

19. A method comprising:
- at a device in a network, generating information representing a load level for one or more virtual server load balancers operating on the device that are configured to assign received network traffic to one of a plurality of servers based on the load of each of the plurality of servers, wherein the information indicates a load level for the one or more virtual server load balancers and an aggregate load across the plurality of servers;
- determining when the load level for at least one of the one or more of the virtual server load balancers exceeds a predetermined threshold;
- in response to determining that the load level for one or more of the virtual server load balancers exceeds the predetermined threshold, instantiating an additional virtual server load balancer configured to assign received network traffic to one of the plurality of servers based on the load of each of the plurality of servers; and
- dynamically allocating the received network traffic to the one or more virtual server load balancers and the additional virtual server load balancer, by performing dynamic modification of one or more Internet Protocol (IP) addresses of one or more respective virtual server load balancers of the one or more virtual server load balancers and the additional server load balancer.

20. The method of claim 19, further comprising collaborating between the one or more virtual server load balancers operating on the device or between the one or more virtual server load balancers on the device and one or more other server load balancers by exchanging information representing load levels.

21. The method of claim 19, wherein instantiating comprises one of instantiating the additional load balancer on the device and instantiating the additional virtual server load balancer on another device.

* * * * *